United States Patent
Kuyper-Hammond et al.

(10) Patent No.: US 8,272,570 B2
(45) Date of Patent: Sep. 25, 2012

(54) MULTI-MODAL ONE-DIMENSIONAL BARCODES

(75) Inventors: Michael Peter Kuyper-Hammond, Kaltbrunn (CH); Michael Charles Osborne, Au (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/288,361

(22) Filed: Nov. 3, 2011

(65) Prior Publication Data

US 2012/0043384 A1 Feb. 23, 2012

Related U.S. Application Data

(62) Division of application No. 12/247,363, filed on Oct. 8, 2008, now Pat. No. 8,146,816.

(51) Int. Cl.
*G06K 7/10* (2006.01)
*G06K 19/06* (2006.01)

(52) U.S. Cl. .................. 235/462.01; 235/494

(58) Field of Classification Search ............ 235/462.01, 235/462.04, 462.07, 462.08, 494
See application file for complete search history.

(56) References Cited

U.S. PATENT DOCUMENTS

| | | | |
|---|---|---|---|
| 4,794,239 A * | 12/1988 | Allais | 235/462.1 |
| 5,384,451 A * | 1/1995 | Smith et al. | 235/462.1 |
| 6,209,788 B1 * | 4/2001 | Bridgelall et al. | 235/462.32 |
| 6,398,117 B1 * | 6/2002 | Oakeson et al. | 235/494 |
| 6,631,843 B2 * | 10/2003 | Schuessler | 235/462.07 |
| 7,185,816 B1 * | 3/2007 | Shoobridge | 235/462.04 |
| 7,229,025 B2 * | 6/2007 | Sussmeier et al. | 235/494 |
| 7,668,406 B2 * | 2/2010 | Schnee et al. | 382/313 |
| 2001/0045461 A1 * | 11/2001 | Schuessler | 235/462.07 |
| 2004/0035925 A1 * | 2/2004 | Wu et al. | 235/380 |
| 2005/0061878 A1 | 3/2005 | Barenburg et al. | |
| 2006/0097062 A1 * | 5/2006 | Cheong et al. | 235/494 |
| 2006/0098241 A1 * | 5/2006 | Cheong et al. | 358/463 |

* cited by examiner

*Primary Examiner* — Tuyen K Vo
(74) *Attorney, Agent, or Firm* — Ryan, Mason & Lewis, LLP

(57) ABSTRACT

Techniques for decoding a multi-modal barcode are provided. The techniques include scanning a multi-modal barcode into a grayscale image, applying a threshold to quantize the grayscale image into a monochrome image, passing the monochrome image to 1D barcode recovery to reconstruct a primary barcode, applying a horizontally-oriented edge detector to the grayscale image to quantize grayscale into monochrome, passing the monochrome image to a 1D barcode recovery process to reconstruct a secondary barcode to decode the multi-modal barcode.

6 Claims, 7 Drawing Sheets

MULTI-MODAL ONE-DIMENSIONAL BARCODES

CROSS REFERENCE TO RELATED APPLICATIONS

This application is a divisional of U.S. patent application Ser. No. 12/247,363, filed Oct. 8, 2008, the disclosure of which are incorporated by reference herein.

FIELD OF THE INVENTION

The present invention generally relates to information technology, and, more particularly, to barcodes.

BACKGROUND OF THE INVENTION

Single-dimensional (1D) barcodes, widely used to encode binary information on machine-readable black and white stripes, have information density limits due to resolution limitations of reading equipment. While the achievable information density of 1D barcodes is limited, 1D codes are robust and widely used even if higher capacity encodings (such as two-dimensional (2D) barcodes) are available.

SUMMARY OF THE INVENTION

Principles of the present invention provide multi-modal one-dimensional (1D) barcodes. An exemplary method (which may be computer-implemented) for decoding a multi-modal barcode, according to one aspect of the invention, can include steps of scanning a multi-modal barcode into a grayscale image, applying a threshold to quantize the grayscale image into a monochrome image, passing the monochrome image to 1D barcode recovery to reconstruct a primary barcode, applying a horizontally-oriented edge detector to the grayscale image to quantize grayscale into monochrome, passing the monochrome image to a 1D barcode recovery process to reconstruct a secondary barcode to decode the multi-modal barcode.

Principles of the present invention also provide an apparatus for reading a multi-modal barcode that includes a camera, an edge detector, wherein the edge detector comprises a filter to read a secondary image, a quantization component, and a barcode processor.

Further, principles of the invention provide a multi-modal barcode that includes a single-dimensional grayscale structure, wherein the structure is stretched in a perpendicular direction to its single-directional axis.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
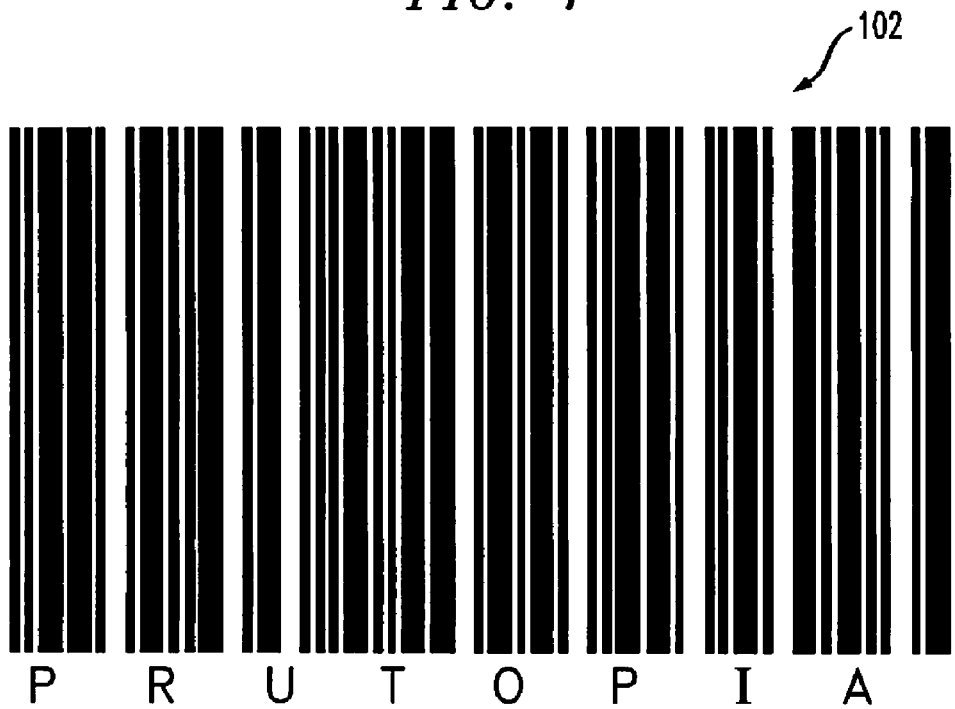
FIG. 1 is a diagram illustrating a region of a sample one-dimensional (1D) barcode, according to an embodiment of the present invention.

Principles of the present invention include creating multi-modal one-dimensional (1D) barcodes. One or more embodiments of the invention include increasing the capacity of 1D barcodes and enabling legacy solutions to be extended with additional data storage capability.

The techniques described herein include an encoding which adds a secondary information channel to 1D barcodes, doubling storage capacity at a negligible increase in physical size. The encoding allows existing equipment to retrieve primary information without modification. Also, one or more embodiments of the invention use a special recovery process to extract the secondary channel from the composite encoding.

Existing approaches have demonstrated that a sufficient higher-resolution encoding may combine two 2D barcodes into a single dual 2D barcode that may be unambiguously deconstructed to its constituent barcodes. One or more embodiments of the invention include a considerably more efficient encoding, optimized for increasing the achievable density of 1D barcodes. The techniques described herein are more efficient than using generic 2D enhancement techniques, and provide an advantageous increase in storage capacity. Further, unlike 2D enhancements, one or more embodiments of the invention allow partial information recovery without modifying the reading process (2D enhancements require additional analogue filtering for both channels).

As described herein, one or more embodiments of the invention include enhancing the amount of information encoded using a 1D barcode, as well as combining two 1D barcode images (primary and secondary) into a single, high resolution, non-standard grayscale barcode. The primary and secondary barcodes are placed with a horizontal displacement of a half barcode unit. Both of the barcodes are combined with this displacement to obtain a combined grayscale barcode. The primary barcode is represented by a 50% quantization of the gradual transition in the combined grayscale barcode. The secondary barcode is represented by a change (for example, a sudden change) transition in the combined grayscale barcode.

One or more embodiments of the invention include a single level mechanism wherein two information channels are combined into a common carrier with a single set of optical characteristics (differing bounding characteristics) that can be implemented using standard reader technology. Additionally, the techniques detailed herein include a high-resolution, grayscale representation of monochrome 1D barcodes that increases the effective data rate, combining two 1D barcode images into a single, high-resolution, non-standard grayscale barcode. The constituent barcodes may also be recovered from the combined image.

One or more embodiments of the invention allow recovery of one constituent image (the primary image) using existing barcode-decoding techniques without modification. To reconstruct the other, secondary image, one can apply another simple filter and perform the same recovery with the same reader equipment. Note that prioritizing images is unique to enhanced-density 1D barcodes. Enhanced 2D barcodes require identical processing for both components, and may not recover one of the images with less effort.

Also, one or more embodiments of the invention restrict operations to barcodes with a stretched structure, including entirely parallel, high contrast, monochrome bars. These bars may be theoretically stretched infinitely. All practical barcode systems use similar encodings, and the techniques described herein will work for future systems based on comparable techniques. As detailed herein, one can assume that barcodes contain vertical bars laid out in a horizontal sequence, as depicted in FIG. 1, regardless of actual barcode orientation.

One or more embodiments of the invention use barcode deposition (laser engraving, printing, or similar technologies) to achieve considerably higher resolution than reading equipment. Deployed systems allow order-of-magnitude differences between encoding and reading resolution, and the techniques detailed herein show how the encoding may be optimized if higher over-sampling is available.

The secondary decoding process filters analogue input before it is passed to the barcode recovery process (which may include initial analogue and then digital processing). One or more embodiments of the invention use monochrome filters, but may be implemented using grayscale approximations if suitable equipment, such as advanced imaging hardware (as opposed to typical, simple laser scanners), is available.

Encoding or decoding is not required to generate or parse barcodes, as one can take existing barcode images as input when decoding. One or more embodiments of the invention rely on an external decoder to recover barcode contents, and will continue to work on similar, stretched 1D structures other than actual barcodes.

As described herein, one can overlay two 1D barcodes of similar dimensions and different content in a way that both barcodes may be recovered by low-resolution scanning equipment. The techniques detailed herein include an encoding that may be separated unambiguously to two different, lower-resolution, 1D barcodes by a filter step. One can recover the primary image without any additional steps (other than those used by existing readers), and an additional filter can be used to recover the secondary image. Post-processing after the additional step is identical to the recovery of the primary barcode.

One or more embodiments of the invention use high-resolution digital processing to combine lower-resolution barcodes. One can combine primary and secondary input to a higher-resolution grayscale dual image with considerably higher resolution requirements. Also, one can use a sufficient number of grayscale levels to allow robust recovery. For example, 4-bit grayscale (16 levels) is probably sufficient, and this requirement is not restrictive.

Input images can be represented as a sequence of bit transitions at predefined distances, as distances between transitions essentially encode all necessary information about a barcode. Such a representation is consistent with the typical representation during recovery. One can also use a grayscale representation that can encode all possible transitions in both primary and secondary images.

Figure 2:
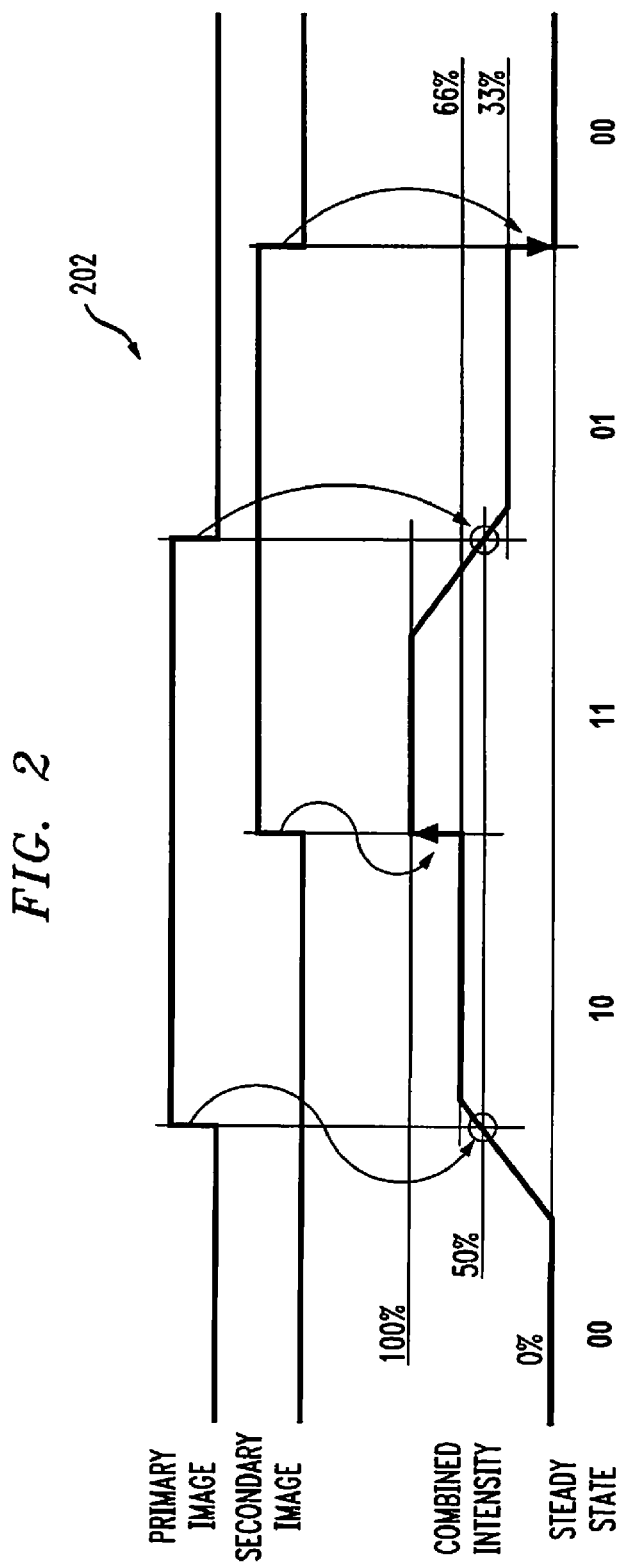
FIG. 2 is a diagram illustrating transition encodings, according to an embodiment of the present invention.

One or more embodiments of the invention include using a physical layout that ensures that transitions in the primary and secondary images are spatially separated. With this simplification, one only needs to encode half of the possible combinations. A naïve encoding would require one to represent all possible transitions, but the techniques described herein introduce restrictions to limit the set. It is advantageous to inhibit simultaneous transitions, and the resulting simplified encoding (as depicted in FIG. 2 and Table 1 below) is simple and efficient.

TABLE 1

Encoding of primary/secondary bit transitions

| Pixel pair intensity | | Combined intensity | | |
|---|---|---|---|---|
| primary | secondary | at start | at end | Transition style |
| 0 → 1 | 0 | 0% | 66% | gradual |
| 1 | 0 → 1 | 66% | 100% | step (rising edge) |
| 1 → 0 | 1 | 100% | 33% | gradual |
| 0 | 1 → 0 | 33% | 0% | step (falling edge) |

One or more embodiments of the invention include encoding that combines information in intensity and intensity gradients. The primary image can be recovered through a single quantization step from intensity. Additionally, one can apply a filter to detect edges based on changes in the intensity gradient, and recover the secondary barcode from the output of the edge detection step.

As such, the encoding includes uniform-intensity grayscale areas where constituent barcodes' pixels are identical and gradual or step intensity changes where the primary or secondary image, respectively, transitions. One can rely on reading equipment recovering barcode contents from these reconstructed images, and one can also allow the primary image to be reconstructed by an off-the-shelf reader. The techniques described herein present the secondary channel as a traditional monochrome image to the reader, which can be reconstructed by a simple edge-detector filter from the combined image.

The proposed encoding also shares the following advantages with enhanced-density 2D barcodes. Two combined barcodes occupy almost the same area as a single barcode would, while effective surface information density is approximately doubled, disregarding barcode overhead. The proposed algorithmic extensions may be implemented in the analogue domain, augmenting existing reading equipment. Additionally, combined images for practical readers may be easily produced by existing encoding equipment, and the higher resolution required during encoding is readily available under normal conditions.

A few advantages, including the following, are unique to enhanced-density 1D barcodes. One of the embedded images may be recovered with less processing, for example, by an unaltered reader. One may use this feature to prioritize embedded content and require unusual reconstruction only for the secondary channel. Also, the enhanced-density 1D encoding is robust and it tolerates readers with imprecise vertical positioning. Specifically, one can combine 1D barcodes to an image with 1D symmetry, and not necessarily to an image with 2D secondary channels.

Recovery of 1D barcodes can include, for example, the following. Image encoding increases the size of the combined image. The increment, however, is less than twice the width of the narrowest possible bar, negligible for practical barcodes. One can use, as an example, sufficient grayscale resolution to robustly quantize the output, as well as estimate gamma correction required to preserve linearity of the encoding. In a controlled environment, such as those around identity cards, materials and printing technology are well-known beforehand, and such a requirement is not restricting. Also, due to the asymmetry in image decoding, analogue quantization thresholds can be different for enhanced 1D barcodes. One or more embodiments of the invention functions when one may easily tune the threshold. One can rely on predefined, fixed values, and therefore the threshold needs no iterative refinement or similar runtime tuning.

The encoding can, for example, process monochrome primary and secondary images of uniform size. In an exemplary embodiment of the invention, one encodes from single-row bit sequences and assumes that empty padding has been applied if input images were of a different size.

As described herein, one can locate the barcode unit of input barcodes, the lowest common denominator of bar widths (which may be a single pixel, depending on encoding). One or more embodiments of the invention include primary and secondary inputs with a horizontal displacement of a half barcode unit (as depicted, for example, in FIG. 4). Inputs can be combined with this displacement, and the techniques described herein effectively define a new raster with half of a barcode unit as raster size.

One can assume, for example, that both barcode borders have an all-light area (both the left and right of barcodes). In terms of FIG. 2, it is assumed that the system is in the 00 "start state." One can initialize output intensity to light (that is, no visible output).

Input images can be scanned from left to right, in the logical order of the combined raster. In this scanning order, one may encounter pixel boundaries in an alternating order between primary and secondary images. The scanning order guarantees that one sees rising and falling edges in consecutive pairs in both inputs individually (but not necessarily when combined). Also, one can track current primary and secondary pixel state in a single, combined, two-bit state variable (see, for example, "steady state" row in FIG. 2).

Upon encountering a transition, one can encode the transition as follows. One can locate the waveform corresponding to the transition (see, for example, FIG. 2 and/or Table 1). Also, the steady state can be extended from the last encoded transition if necessary. As there are no changes between transitions, one may extend a single constant level between transitions. One can also append the transition to the generated waveform. In the case of gradual transitions, one may adapt the slope to match the characteristics of media and reading equipment.

Additionally, the state can be updated to reflect the end state. One can assume that the steady state has been reached at the half-point between the current transition and the next possible one. When processing the last transition of the secondary image, one can append a bar of all-light (white) material. The generated waveform may be directly deposited to the surface.

As described herein, one or more embodiments of the invention include decoding. The recovery process of a single, combined barcode can include the following. The primary image can be retrieved through a 50% quantization of the grayscale combined barcode. Note that the transition encoding guarantees that only primary transitions cross the 50% level. Secondary transitions are therefore ignored by the quantizer.

Note also that the most practical barcode algorithms provide an all-dark lead-in region at barcode edges (for recognition and separation purposes). Combined with the single-bar white content, the techniques described herein are introducing, during encoding, the combined image containing a high-contrast region at the beginning, allowing efficient luminosity calibration even if the combined barcode is grayscale. Otherwise, for example, one would need to resort to a full scan to detect the luminosity range and calibration threshold.

Secondary recovery can include an edge detector instead of quantizing first. Note that one can assume that the deposited resolution is sufficiently high to differentiate gradual transitions from steps (see, for example, FIG. 5). Under such conditions, the only sudden changes (high-gradient lines) correspond to transitions in the secondary image.

Additionally, note that one or more embodiments of the invention can encode sample images with an offset in the gradient encoding. This results in a visible misalignment between primary and secondary reconstruction, but recovered images themselves are consistent.

Figure 3:
FIG. 3 is a diagram illustrating primary and secondary images (regions of interest), according to an embodiment of the present invention.

As described herein, the following figures detail one or more exemplary embodiments of the invention. FIG. 1 is a diagram illustrating a region of a sample 1D barcode 102, according to an embodiment of the present invention. FIG. 2 is a diagram illustrating transition encodings 202, according to an embodiment of the present invention. Also, FIG. 3 is a diagram illustrating primary and secondary images (regions of interest) 302, according to an embodiment of the present invention.

Figure 4:
FIG. 4 is a diagram illustrating primary and secondary images, aligned for encoding, according to an embodiment of the present invention.
Figure 5:
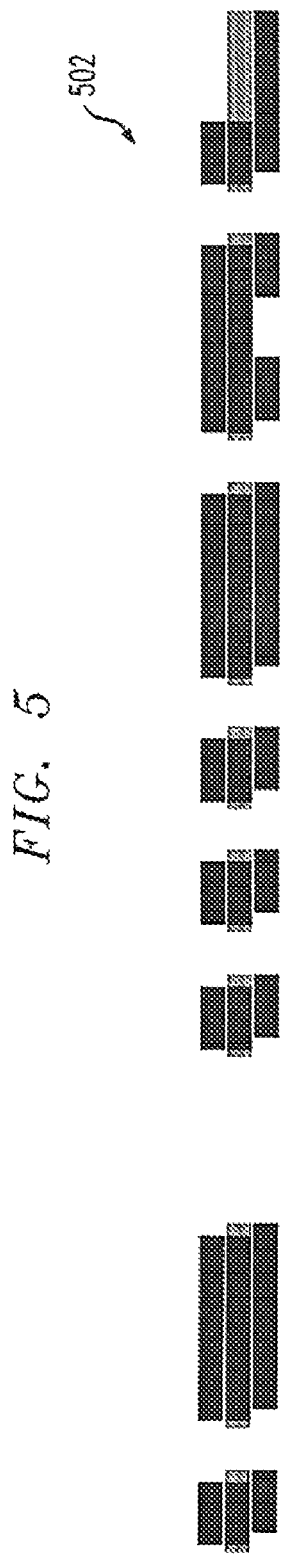
FIG. 5 is a diagram illustrating quantized output, combined barcode, edge-detector output, according to an embodiment of the present invention.

Additionally, FIG. 4 is a diagram illustrating primary and secondary images 402, aligned for encoding, according to an embodiment of the present invention. Further, FIG. 5 is a diagram illustrating quantized output 502, combined barcode, edge-detector output, according to an embodiment of the present invention.

Figure 6:
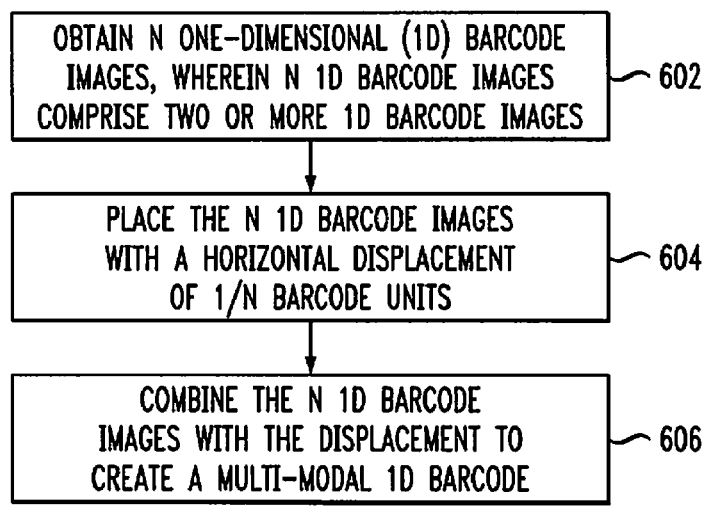
FIG. 6 is a flow diagram illustrating techniques for creating a multi-modal one-dimensional (1D) barcode, according to an embodiment of the present invention.

FIG. 6 is a flow diagram illustrating techniques for creating a multi-modal one-dimensional (1D) barcode, according to an embodiment of the present invention. Step 602 includes obtaining N one-dimensional (1D) barcode images, wherein the 1D barcode images comprise two or more 1D barcode images. One of the 1D barcode images can include, for example, a 1D barcode image represented by a 50% quantization of a gradual transition in the multi-modal 1D barcode. Also, one of the 1D barcode images can include a 1D barcode image represented by a change (for example, a sudden change) transition in the multi-modal 1D barcode.

Step 604 includes placing the N 1D barcode images with a horizontal displacement (that is, orthogonal to the bars) of 1/N barcode units. The displacement can include 1/N barcode units, for example, because one can displace all barcodes so that all sub-barcodes would transition once while the global barcode grid advances one unit. Step 606 includes combining the N 1D barcode images with the displacement to create a multi-modal 1D barcode (for example, a grayscale multi-modal 1D barcode). Combining the 1D barcode images with the displacement can include, for example, combining two or more information channels into a common carrier with a single set of one or more optical characteristics.

The techniques depicted in FIG. 6 can also include, for example, using an encoding to add a secondary information channel to the multi-modal 1D barcode, as well as using a decoding process to filter analogue input before it is passed to a barcode recovery process. Additionally, one or more embodiments of the invention can also include encoding a transition, wherein encoding a transition includes locating a waveform corresponding to the transition, extending a single constant level between one or more transitions, and appending the transition to a generated waveform. Further, one can also encode a transition by combining information in intensity and one or more intensity gradients.

Figure 7:
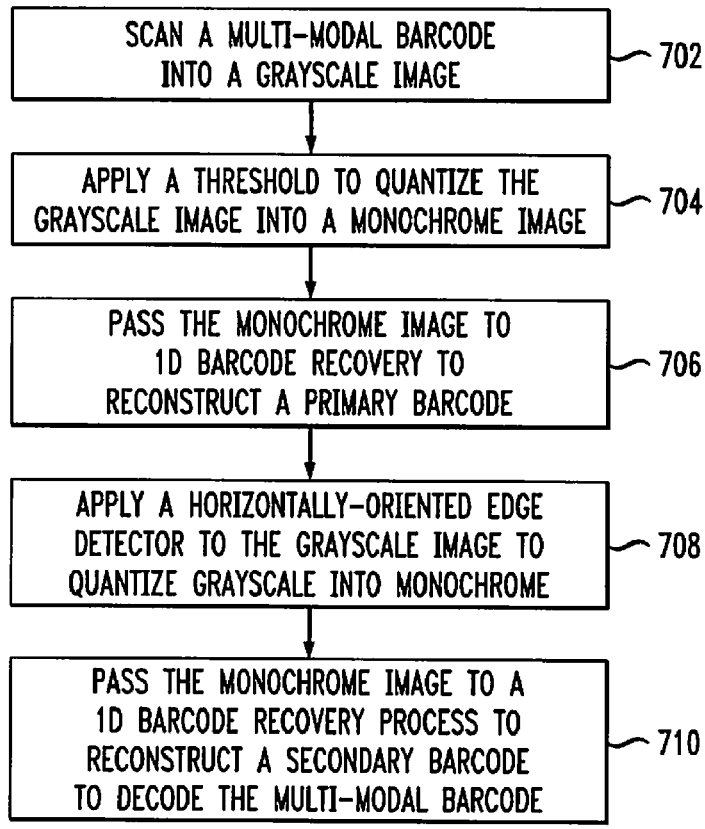
FIG. 7 is a flow diagram illustrating techniques for decoding a multi-modal barcode, according to an embodiment of the present invention.

FIG. 7 is a flow diagram illustrating techniques for decoding a multi-modal barcode, according to an embodiment of the present invention. Step 702 includes scanning a multi-modal barcode (for example, scanning at a sufficiently high resolution to perform the task) into a grayscale image (or an equivalent, internal representation). Step 704 includes applying a threshold (for example, a 50% threshold) to quantize the grayscale image into a monochrome image.

Step 706 includes passing the monochrome image to 1D barcode recovery to reconstruct a primary barcode. Step 708 includes applying a horizontally-oriented edge detector (with its setup-dependent threshold) to the grayscale image to quantize grayscale into monochrome. One can locate a horizontal direction, for example, by reconstructing lines perpendicular to the bars' characteristic dimension. Step 710 includes passing the monochrome image (from the applying step) to a 1D barcode recovery process to reconstruct a secondary barcode to decode the multi-modal barcode.

Figure 8:
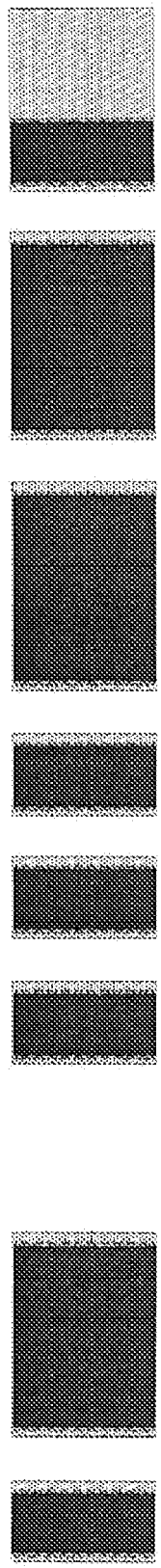
FIG. 8 is a diagram illustrating an exemplary multi-modal barcode, according to an embodiment of the present invention.
Figure 9:
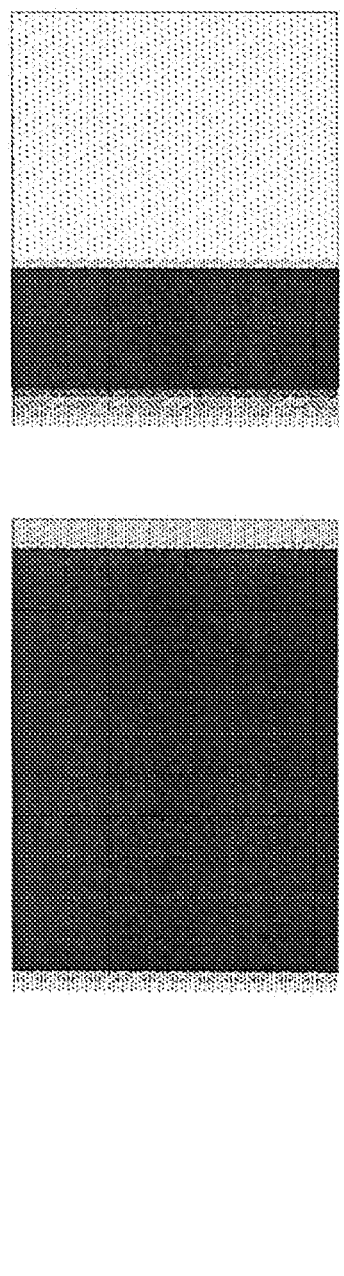
FIG. 9 is a diagram illustrating a magnified view of an exemplary multi-modal barcode, according to an embodiment of the present invention.

Additionally, one or more embodiments of the invention include a multi-modal barcode, wherein the barcode includes a single-dimensional grayscale structure, wherein the structure is stretched in a perpendicular direction to its single-directional axis. For example, FIG. 8 is a diagram illustrating an exemplary multi-modal barcode 802, according to an embodiment of the present invention, and FIG. 9 is a diagram illustrating a magnified view of an exemplary multi-modal barcode 902, according to an embodiment of the present invention.

Unlike disadvantageous existing approaches, one or more embodiments of the invention can also include encoding that uses an entirely dark region (for example, a bar), an entirely light region (for example, a bar), a uniform, light-gray region, a uniform, dark-gray region, an abrupt transition between a pair of uniform-colored regions (each of which may be entirely dark/light or uniformly dark/light), and a gradual transition between a pair of uniform-colored regions.

One or more embodiments of the present invention also include an apparatus for reading a multi-modal barcode that includes a camera, an edge detector, wherein the edge detector comprises a filter to read a secondary image, a quantization component, and a barcode processor.

Figure 10:
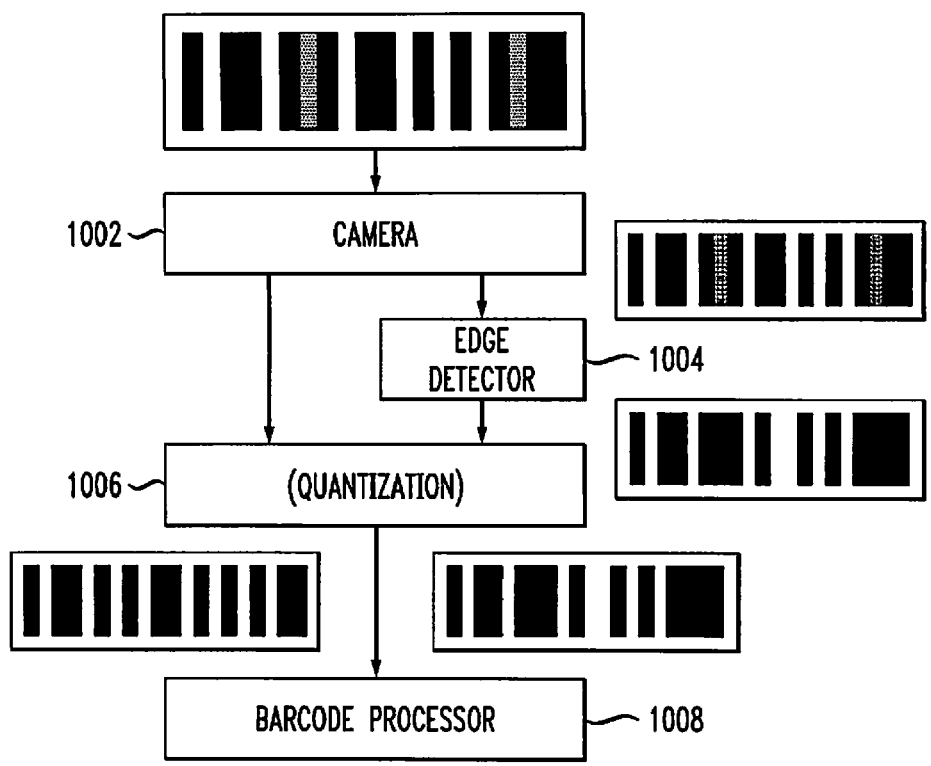
FIG. 10 is a diagram illustrating an exemplary apparatus for reading a multi-modal barcode, according to an embodiment of the present invention.

Similarly, FIG. 10 is a diagram illustrating an exemplary apparatus for reading a multi-modal barcode, according to an embodiment of the present invention. By way of illustration, FIG. 10 depicts the components of a camera 1002, an edge detector 1004, a quantization component 1006 and a barcode processor 1008. FIG. 10 also illustrates how an image (that is, via the various barcode images depicted in the figure) would be perceived at different stages of processing. The edge-detection component 1004 can, for example, be a filter that either edge-detects or passes through.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 11:
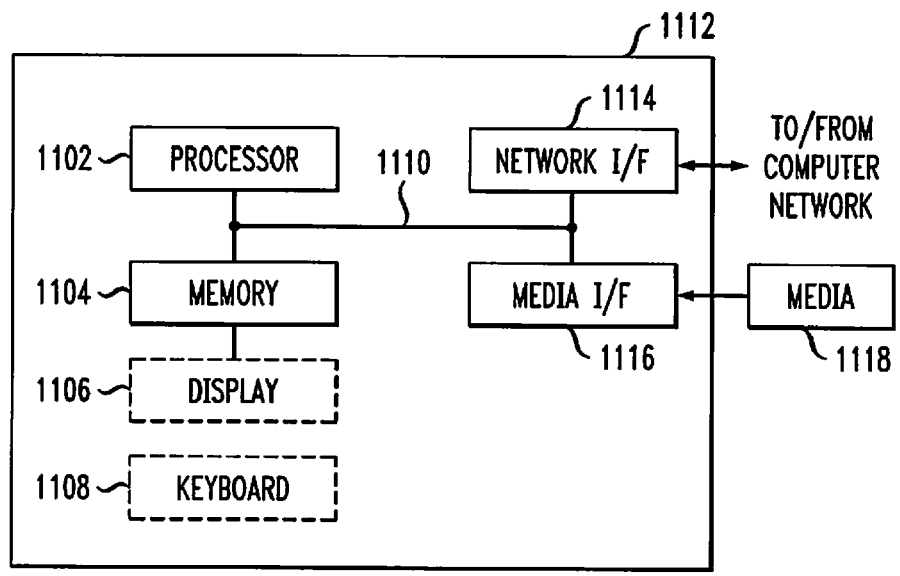
FIG. 11 is a system diagram of an exemplary computer system on which at least one embodiment of the present invention can be implemented.

At present, it is believed that the preferred implementation will make substantial use of software running on a general-purpose computer or workstation. With reference to FIG. 11, such an implementation might employ, for example, a processor 1102, a memory 1104, and an input and/or output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1102, memory 1104, and input and/or output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1118) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1104), magnetic tape, a removable computer diskette (for example, media 1118), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1102 coupled directly or indirectly to memory elements 1104 through a system bus 1110. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, representing secondary barcode by a sudden change transition in the combined grayscale barcode.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for decoding a multi-modal barcode, comprising the steps of:
    scanning a multi-modal barcode into a grayscale image comprising two one-dimensional (1D) barcode images, wherein the two 1D barcode images include a primary barcode and a secondary barcode;
    applying a threshold to quantize the grayscale image into a monochrome image;
    passing the monochrome image to 1D barcode recovery to reconstruct the primary barcode;
    applying a horizontally-oriented edge detector to the grayscale image to quantize grayscale into monochrome; and
    passing the monochrome image to a 1D barcode recovery process to reconstruct the secondary barcode to decode the multi-modal barcode.

2. The method of claim 1, wherein scanning a multi-modal barcode into a grayscale image comprises scanning at a sufficiently high resolution to perform grayscale image task.

3. The method of claim 1, wherein scanning a multi-modal barcode into a grayscale image comprises scanning a multi-modal barcode into an equivalent, internal representation to a grayscale image.

4. The method of claim 1, wherein applying a threshold to quantize the grayscale image into a monochrome image comprises applying a 50% threshold to quantize the grayscale image into a monochrome image.

5. The method of claim 1, wherein the horizontally-oriented edge detector includes a setup-dependent threshold.

6. The method of claim 1, further comprising locating a horizontal direction by reconstructing one or more lines perpendicular to a character dimension of the image.

\* \* \* \* \*